United States Patent Office 3,474,052
Patented Oct. 21, 1969

3,474,052
RUBBER STABILIZED WITH PHOSPHONITRILIC COMPOUNDS
Adel F. Halasa, Akron, and Jerry D. Hunt, Cuyahoga Falls, Ohio, assignors to The Firestone Tire & Rubber Company, Akron, Ohio, a corporation of Ohio
No Drawing. Filed Apr. 24, 1968, Ser. No. 723,879
Int. Cl. C08c 7/10; C08d 7/10
U.S. Cl. 260—3                               13 Claims

ABSTRACT OF THE DISCLOSURE

The process and product described herein involve a method of protecting a tire rubber composition against ozone deterioration by incorporating in the tire rubber stock, a phosphonitrilic cyclic compound having the formula $(NPY_2)_x$ or a phosphonitrilic polymeric compound having the formula

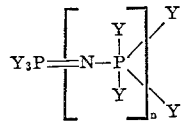

or the reaction product of one mole of phosphonitrilic chloride of the formula $(NPCl_2)_x$ and 1–8 moles of thiourea or mercaptobenzothiazole per mole of phosphonitrilic chloride wherein X is 3 or 4, $n$ is 2–100, Y is a monovalent radical such as Cl, Br, I, NHOH, NHR', N(R)'NHR', SH, Na, Li or Mg, and R' is hydrogen or a hydrocarbon radical. Each Y can represent a group similar to or different from any other Y group in the particular formula. The phosphonitrilic derivatives are found to have excellent non-staining antiozonant properties.

BACKGROUND OF THE INVENTION

Field of the invention

This invention relates to tire rubber compositions produced by the incorporation of phosphonitrilic derivatives in tire rubber stocks, which derivatives are found to be excellent antiozonants.

Related prior art

The prior art does not disclose any tire stock compositions containing phosphonitrilic derivatives.

It is desirable for any antiozonant and antioxidant that it be capable of resisting ozonization and oxidation for prolonged periods so that the compositions in which they are incorporated will retain their original properties. The less effective the antiozonant or antioxidant is the sooner the properties deteriorate upon exposure to ozone or oxygen, and vice versa the more effective the antiozonant or antioxidant is the longer the composition retains its original properties. Consequently, there is a continuous search to find materials that will prolong the period during which a tire stock will retain its original properties, such as flex strength, tensile strength, ultimate elongation, and for white sidewall stock non-staining properties.

Normally p-phenylenediamine derivatives are used as antioxidants and antiozonants but because of their staining properties these cannot be used in white sidewall stocks. Therefore none are used in the white sidewall stocks and the only protection again ozonization is the small amount derived from the waxes that are used.

SUMMARY OF THE INVENTION

The composition of this invention comprises a tire rubber stock composition predominantly of a rubbery material such as natural rubber or a butadiene-styrene elastomer having 10–25% styrene and 90–75% butadiene copolymerized therein together with 0.1–10%, preferably 0.5–2% of a phosphonitrilic compound selected from the class consisting of
 (1) A cyclic phosphonitrilic compound having the formula $(NPY_2)_x$;
 (2) A phosphonitrilic polymer having the formula

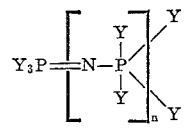

and
 (3) The reaction product of one mole of phosphonitrilic chloride of the formula $(NPCl_2)_x$, or even some of the other $(NPY_2)_x$ compounds, with 1–8 moles of thiourea or mercaptobenzothiazole; wherein $x$ has a value of 3 or 4; $n$ has a value of 2 to 100; Y is a radical selected from the class consisting of Cl, Br, I, NHOH, NHR', N(R')NHR', SH, Na, Li and Mg; and R' is hydrogen or a hydrocarbon radical preferably having no more than 20 carbon atoms therein.

The R' hydrocarbon group is preferably alkyl, aryl, aralkyl, alkaryl and cycloalkyl. While alkenyl, alkynyl, alkenyl-aryl, cycloalkenyl groups and other unsaturated groups can be used, hydrocarbon groups are preferred which are saturated in the aliphatic portions.

Typical preferred hydrocarbon groups are methyl, ethyl, propyl, butyl, amyl, hexyl, octyl, decyl, octadecyl, phenyl, tolyl, diphenyl, xylyl, naphthyl, methylnaphthyl, ethylphenyl, benzyl, phenethyl, cyclopentyl, cyclohexyl, cyclohexylmethyl, methylcyclohexyl, cycloheptyl, cycloheptylpropyl and the like.

In the tire stock compositions of this invention, various other components generally found in a tire composition are also present such as carbon black, zinc oxide, stearic acid, processing oil, filler, wax, sulfur and accelerator. These are present in the usual proportions. As described more fully hereinafter, the presence of the phosphonitrilic component in the tire stock composition gives excellent retention of the desirable properties such as bending modulus or flexing strength, tensile strength, ultimate stretch and non-staining properties.

In addition to the natural rubber and butadiene-styrene elastomers mentioned above, other elastomers can be used in the tire stock compositions of this invention such as polybutadiene, polyisoprene, butadiene-acrylonitrile copolymers and in general the conjugated diene polymers considered suitable for use in tires.

The cyclic phosphonitrilic compounds are 6-membered rings when x in the formula represents 3, and 8-membered rings when x represents 4. The derivatives having Y groups other than chlorine can be prepared by replacement of chlorine form either phosphonitrilic dichloride trimer or tetramer with the desired Y group, such as Br, I, NHOH, NHR' or the other Y components. The conditions for such replacements are similar to those suitable for replacing chlorine by the respective Y component from other compounds such as phosphoric chloride compounds.

The phosphonitrilic dichloride polymers of Formula 2 are prepared according to the methods disclosed by Sorenson and Campbell on pp. 262–263 in "Preparative Methods of Polymer Chemistry," Interscience Publishers (1961). Other polymers of the formula can be prepared by replacing chlorine from either the polymer or from a starting monomeric compound, generally preferably from a preformed polymer. The polymer molecular weights are preferably in the range of 100–5000.

Typical compounds suitable for the practice of this invention are listed below in Tables I and II and some of the formulaes for these are given immediately below:

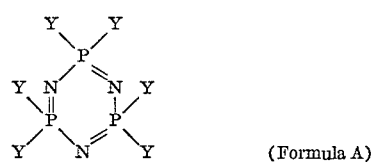
(Formula A)

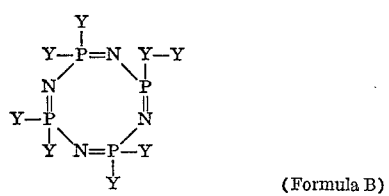
(Formula B)

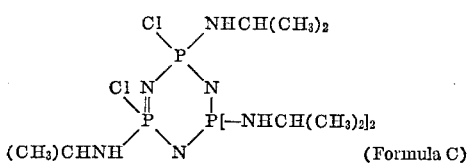
(Formula C)

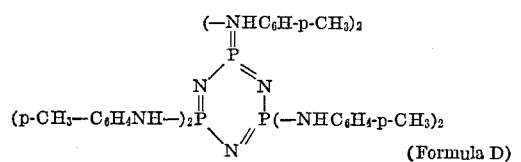
(Formula D)

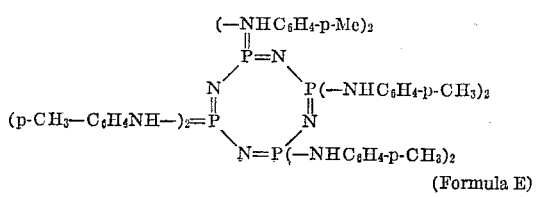
(Formula E)

TABLE I — 2,4,6-triphospho-1,3,5-triazine with various substituents positioned as indicated below

| Compound | 2 | 2 | 4 | 4 | 6 | 6 |
|---|---|---|---|---|---|---|
| C | —NHCH(CH$_3$)$_2$ | —NHCH(CH$_3$)$_2$ | —NHCH(CH$_3$)$_2$ | —NHCH(CH$_3$)$_2$ | —NHCH(CH$_3$)$_2$ | —NHCH(CH$_3$)$_2$ |
| D | —NHC$_6$H$_4$-p-CH$_3$ | —NHC$_6$H$_4$-p-CH$_3$ | —NHC$_6$H$_4$-p-CH$_3$ | —NHC$_6$H$_4$-p-CH$_3$ | —NHC$_6$H$_4$-p-CH$_3$ | —NHC$_6$H$_4$-p-CH$_3$ |
| E | Cl | Cl | Cl | Cl | Cl | Cl |
| F | Cl | Cl | Cl | Cl | Cl | —NHC$_6$H$_4$-p-CH$_3$ |
| G | —NHC$_6$H$_4$-p-NHC$_6$H$_5$ | —NHC$_6$H$_4$-p-NHC$_6$H$_5$ | —NHC$_6$H$_4$-p-NHC$_6$H$_5$ | —NHC$_6$H$_4$-p-NHC$_6$H$_5$ | —NHC$_6$H$_4$-p-NHC$_6$H$_5$ | —NHC$_6$H$_4$-p-NHC$_6$H$_5$ |
| H | —NHCH(CH$_3$)C$_2$H$_5$ | —NHCH(CH$_3$)C$_2$H$_5$ | —NHCH(CH$_3$)C$_2$H$_5$ | —NHCH(CH$_3$)C$_2$H$_5$ | —NHCH(CH$_3$)C$_2$H$_5$ | —NHCH(CH$_3$)C$_2$H$_5$ |
| I | —N(CH$_3$)$_2$ | —N(CH$_3$)$_2$ | —N(CH$_3$)$_2$ | —N(CH$_3$)$_2$ | —N(CH$_3$)$_2$ | —N(CH$_3$)$_2$ |
| J | —N(CH$_2$)$_5$ | —N(CH$_2$)$_5$ | —N(CH$_2$)$_5$ | —N(CH$_2$)$_5$ | —N(CH$_2$)$_5$ | —N(CH$_2$)$_5$ |
| K | —NHC$_5$H$_{11}$ | —NHC$_5$H$_{11}$ | —NHC$_5$H$_{11}$ | —NHC$_5$H$_{11}$ | —NHC$_5$H$_{11}$ | —NHC$_5$H$_{11}$ |
| L | —NHCH(CH$_3$)$_2$ | —NHCH(CH$_3$)$_2$ | —NHCH(CH$_3$)$_2$ | —NHCH(CH$_3$)$_2$ | —NHCH(CH$_3$)$_2$ | —NHCH(CH$_3$)$_2$ |
| M | Br | Br | Br | Br | Br | Br |
| N | —NHCH$_3$ | —NHCH$_3$ | —NHCH$_3$ | —NHCH$_3$ | —NHCH$_3$ | —NHCH$_3$ |
| O | 1,2,4-trimethyl-n-amyl-amino | 1,2,4-trimethyl-n-amyl-amino | 1,2,4-trimethyl-n-amyl-amino | 1,2,4-trimethyl-n-amyl-amino | 1,2,4-trimethyl-n-amyl-amino | 1,2,4-trimethyl-n-amyl-amino |
| O | —N(CH$_3$)NHCH$_3$ | —N(CH$_3$)NHCH$_3$ | —N(CH$_3$)NHCH$_3$ | —N(CH$_3$)NHCH$_3$ | —N(CH$_3$)NHCH$_3$ | —N(CH$_3$)NHCH$_3$ |
| P | —NHNHC$_6$H$_5$ | —NHNHC$_6$H$_5$ | —NHNHC$_6$H$_5$ | —NHNHC$_6$H$_5$ | —NHNHC$_6$H$_5$ | —NHNHC$_6$H$_5$ |
| Q | Cl | Cl | —S—C(=N-C$_6$H$_4$(o))S | —S—C(=N-C$_6$H$_4$(o))S | Cl | —S—C(=N-C$_6$H$_4$(o))S |
| R | Br | Cl | Br | Cl | Br | Cl |
| S | I | Cl | I | Cl | I | Cl |
| T | SH | L | SH | L | SH | L |
| U | NHOH | Cl | NHOH | Cl | NHOH | Cl |
| V | NH$_2$ | NHOH | NH$_2$ | NHOH | NH$_2$ | NHOH |
| W | NH$_2$ | Cl | NH$_2$ | Cl | NH$_2$ | Cl |
| X | NH$_2$ | NH$_2$ | NH$_2$ | NH$_2$ | NH$_2$ | NH$_2$ |
| Y | NHNH$_2$ | Cl | NHNH$_2$ | Cl | NHNH$_2$ | Cl |

TABLE II
2,4,6,8-tetraphospho-1,3,5,7-tetrazines with various substituents positioned as indicated below

| | 2 | 2 | 4 | 4 | 6 | 6 | 8 | 8 |
|---|---|---|---|---|---|---|---|---|
| Compound: | | | | | | | | |
| E | PMA [1] | PMA | PMA | PMA | PMA | PMA | PMA | PMA |
| AA | Cl | Cl | Cl | Cl | Cl | Cl | Cl | Cl |
| BB | Br | Cl | Br | Cl | Br | Cl | Cl | Cl |
| CC | I | Cl | I | Cl | Cl | Cl | Cl | Cl |
| DD | SBA [2] | SBA | SBA | SBA | SBA | SBA | SBA | SBA |
| EE | $-N(CH_2)_5$ | $-N(CH_2)_5$ | $-N(CH_2)_5$ | $-N(CH_2)_5$ | $-N(CH_2)_5$ | $-N(CH_2)_5$ | $-N(CH_2)_5$ | $-N(CH_2)_5$ |
| FF | DMH [3] | DMH | DMH | DMH | DMH | DMH | DMH | DMH |
| GG | PH [4] | PH | PH | PH | PH | PH | PH | PH |
| HH | BTH [5] | Cl | BTH | Cl | Cl | Cl | Cl | Cl |
| II | NHOH | Cl | NHOH | Cl | NHOH | Cl | NHOH | Cl |

[1] PMA is $-NHC_6H_4$-p-$CH_3$.
[2] SBA is $-NHCH(CH_3)C_2H_5$.
[3] DMH is $-N(CH_3)NHCH_3$.
[4] PH is $-NHNHC_6H_5$.

[5] BTH is 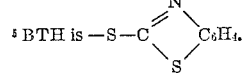

In preparing the various phosphonitrilic compounds included in the formula, the phosphonitrilic dichloride compounds are generally used as the starting material and the chlorine replaced by the respective Y groups, as illustrated in Quarterly Reviews: Vol. 18, No. 2, pp. 168–210 (1964), and in other references cited therein. For example, when NHOH, NHR', NHNHR', N(R')NHR' are to be substituted the corresponding hydroxylamine, amine, substituted hydrazine or hydrazo compound is reacted with the desired phosphonitrilic dichloride base in the presence of an acid acceptor such as a tertiary amine, e.g. tributyl amine. The appropriate stoichiometric proportion, or a slight excess, is used in order to introduce the desired number of Y groups.

When a mercapto group is to be added, this can be effected by reaction of the appropriate phosphonitrilic dichloride with sodium mercaptan. When sodium, lithium or magnesium is to be the Y group, this can be introduced by reaction of the phosphonitrilic dichloride with sufficient of the appropriate metal to remove the chlorine and to substitute the metal on the phosphorus. With the divalent magnesium, the product is either disubstituted with two phosphorus atoms attached to the magnesium or the phosphorus has the MgCl radical attached thereto, depending on the proportions of the materials used.

These metal derivatives can be used as such in the tire compositions or can be further reacted with ketones or other compounds to substitute derivatives on the phosphorus. For example acetone can be reacted with such a compound which has sodium, lithium or magnesium attached to the phosphorus and the metal replaced by an isopropanol radical.

If it is desired to introduce a hydrocarbon radical, this can be done by reaction of the phosphonitrilic dichloride compound with a sodium or lithium alkyl, or other hydrocarbon derivative, or with a Grignard so that the chlorine is removed by reaction with the metal and the hydrocarbon is substituted on the phosphorus directly.

The types of tire stocks used in the practice of this invention are those normally used for black and white sidewall tires in which the major component is either natural rubber or a synthetic elastomer such as a polymer or copolymer or a conjugated diene e.g. butadiene-1,3 or isoprene. In such a tire stock there is generally a filler, zinc oxide, stearic acid, wax, processing oil, sulfur for vulcanization, an accelerator and an antitoxidant or antiozonant.

In the black sidewall stock, the major part of the filler can comprise a semi-reinforcing carbon black. Such stocks should have good properties with resistance to weather and age cracking, resistance to flex fatigue, curb abrasion resistance, good adhesion to other components in the tire, correct color match with other components of the tire, appropriate properties for mixing, calendering and tubing, satisfactory tire building properties, good molding characteristics and compatability with other factory stocks.

White sidewall stocks are generally made with natural rubber, either alone or blended with a butadiene-styrene elastomer. Black tire stocks are generally made from synthetic elastomers. These can be compounded with reclaimed rubber to reduce the cost and still give excellent service and satisfactory processing. Oil-extended rubber can also be used. However, since oil-extended polymers generally show some loss in checking resistance, it is necessary to offset this with greater antiozonant protection. The standard tire stocks generally also contain a filler, a wax, an accelerator and sulfur.

This invention will be more fully described by the following examples. The invention is not to be regarded, however, as restricted in any way by these examples, and they are to serve merely as illustrations. In these examples and throughout the specification, "parts" and "percentages" are by weight unless specifically provided otherwise.

EXAMPLE I

A series of tests are performed using the proportions of components for a typical black oil-extended tire stock comprising a 75–25 butadiene styrene elastomer having a large amount of semi-reinforcing carbon black and the usual additives. All of the ingredients except the sulfur, accelerator and antiozonant are mixed on a Banbury mixer and the resultant masterbatch mixture is then put on a heated roll (160–180° F.) and the sulfur, accelerant and antiozonant are added and blended in. The proportions and type of antiozonant are indicated below in Table III and also the results for various properties tested after the tire stock is cured at 300° F.

In some of the tests antiozonants A and B are used for comparative purposes. These are phenylenediamine derivatives which are presently used in black tire stocks. However, these cannot be used in white sidewall stocks since they immediately discolor. Antiozonant I is N-2-(4-methyl-pentyl)-N'-phenyl-p-phenylenediamine and II is N,N'-bis-sec-heptyl-p-phenylenediamine. In ozone exposure tests conducted at 95° F. and 40° F., the compounds of Formula E and C give approximately the same results as found with antiozonants I and II but have the advantage that they can be used in smaller amounts and can also be used in white sidewall stocks so it is necessary to store only one type of antioxidant for both types of tire stock.

TABLE III

| | A-2 | A-3 | A-4 | A-5 | A-6 | A-7 |
|---|---|---|---|---|---|---|
| Antiozonant Compound: | | | | | | |
| I, pts | 2.5 | 1.4 | | | | |
| II, pts | | 1.4 | 1.4 | 1.4 | | |
| Formula E, pts | | | 1.4 | | 2.5 | |
| Formula C, pts | | | | 1.4 | | 2.5 |
| Normal Stress-Strain Cured at 300° F. | | | | | | |
| 300% Modulus (p.s.i.), Mins.: | | | | | | |
| 10 | 50 | 225 | [1]N.C. | N.C. | N.C. | N.C. |
| 15 | 350 | 575 | 475 | 125 | 175 | 50 |
| 23 | 625 | 675 | 650 | 350 | 550 | 150 |
| 30 | 725 | 750 | 750 | 525 | 675 | 275 |
| 400% Modulus (p.s.i.), Mins.: | | | | | | |
| 10 | 50 | 375 | N.C. | N.C. | N.C. | N.C. |
| 15 | 550 | 750 | 675 | 150 | 250 | N.T. |
| 23 | 925 | 1,050 | 950 | 525 | 775 | 250 |
| 30 | 1,050 | 1,075 | 1,050 | 750 | 1,000 | 400 |
| Tensile Strength (p.s.i.), Mins.: | | | | | | |
| 10 | 75 | 875 | N.C. | N.C. | N.C. | N.C. |
| 15 | 1,175 | 1,350 | 1,325 | 150 | 500 | 100 |
| 23 | 1,425 | 1,525 | 1,450 | 1,125 | 1,425 | 450 |
| 30 | 1,525 | 1,425 | 1,500 | 1,300 | 1,475 | 750 |
| Ultimate Elongation (percent), Mins.: | | | | | | |
| 10 | 770 | 850 | N.C. | N.C. | N.C. | N.C. |
| 15 | 770 | 620 | 750 | 860 | 760 | 840 |
| 23 | 620 | 580 | 622 | 840 | 700 | 750 |
| 30 | 580 | 520 | 570 | 740 | 590 | 760 |
| Aged 4 Days at 212° F. | | | | | | |
| 300% Modulus (p.s.i.), Mins.: | | | | | | |
| 10 | 750 | [2]N.T. | N.C. | N.C. | N.C. | N.C. |
| 15 | N.T | N.T. | N.T. | 1,025 | 1,325 | 500 |
| 23 | 1,475 | N.T. | 1,575 | 1,175 | 1,500 | 700 |
| 30 | 1,509 | N.T. | 1,475 | 1,200 | 1,500 | 825 |
| Tensile (p.s.i.), Mins.: | | | | | | |
| 10 | 975 | 1,275 | N.C. | N.C. | N.C. | N.C. |
| 15 | 1,350 | 1,450 | 1,350 | 1,425 | 1,400 | 1,075 |
| 23 | 1,550 | 1,425 | 1,575 | 1,475 | 1,500 | 1,275 |
| 30 | 1,525 | 1,500 | 1,525 | 1,500 | 1,500 | 1,400 |

[1] N.C. means No cure.
[2] N.T. means Not tested.
Note.—The parts indicated for the antiozonant are per 100 parts of rubber material in the tire stock.

EXAMPLE II

The procedure of Example I is repeated a number of times using a phosphonitrilic compound having Formula D in the amounts and with the results shown below in Table IV. Here again the phosphonitrilic compound gives as good protection as Antiozonants I and II identified in Example I and has the same advantage as Compounds C and E in that it can be used in smaller amount and can also be used in white sidewll tire stock.

TABLE IV

| | A-8 | A-9 | A-10 | A-11 |
|---|---|---|---|---|
| Antiozonant Compound: | | | | |
| I, pts | 2.5 | 1.4 | | |
| II, pts | | 1.4 | 1.4 | |
| Formula D | | | 1.4 | 2.5 |
| Normal Stress-Strain Values, After Curing at 300° F. | | | | |
| 300% Modulus (p.s.i.), Mins.: | | | | |
| 10 | 50 | 250 | 175 | No cure |
| 15 | 300 | 450 | 350 | 25 |
| 23 | 550 | 625 | 550 | 250 |
| 30 | 600 | 650 | 625 | 400 |
| 400% Modulus (p.s.i.), Mins.: | | | | |
| 10 | 125 | 425 | 275 | No cure |
| 15 | 475 | 650 | 525 | 50 |
| 23 | 800 | 900 | 825 | 425 |
| 30 | 900 | 975 | 900 | 600 |
| Tensile Strength (p.s.i.), Mins.: | | | | |
| 10 | 275 | 1,050 | 650 | No cure |
| 15 | 1,125 | 1,400 | 1,225 | 25 |
| 23 | 1,500 | 1,550 | 1,475 | 1,125 |
| 30 | 1,550 | 1,550 | 1,500 | 1,250 |
| Ultimate Elongation (percent), Mins.: | | | | |
| 10 | 840 | 890 | 910 | No cure |
| 15 | 900 | 780 | 840 | 830 |
| 23 | 710 | 670 | 680 | 900 |
| 30 | 650 | 630 | 700 | 730 |
| After Ageing 4 Days at 212° F. | | | | |
| 300% Modulus (p.s.i.), Mins.: | | | | |
| 10 | 1,000 | 1,600 | 1,350 | No cure |
| 15 | 1,475 | 1,575 | | 975 |
| 23 | 1,500 | 1,525 | 1,475 | 1,250 |
| 30 | 1,500 | 1,500 | 1,475 | 1,300 |
| Tensile (p.s.i.), Mins.: | | | | |
| 10 | 1,125 | 1,650 | 1,500 | No cure |
| 15 | 1,525 | 1,575 | 1,375 | 1,250 |
| 23 | 1,575 | 1,650 | 1,550 | 1,450 |
| 30 | 1,525 | 1,625 | 1,575 | 1,450 |
| Elongation (percent), Mins.: | | | | |
| 10 | 340 | 310 | 330 | No cure |
| 15 | 310 | 300 | 270 | 390 |
| 23 | 310 | 330 | 310 | 340 |
| 30 | 300 | 320 | 330 | 330 |

EXAMPLE III

The procedure of Example I is repeated a number of times with similar results using a different black sidewall tire stock comprising a 75–25 butadiene styrene elastomer with minor amounts of reclaimed rubber and carbon black using the phosphonitrilic compounds of Formulas C, D and E.

EXAMPLE IV

A series of tests are performed with a white sidewall stock comprising about 75% natural rubber and 25% of a 75–25 butadiene styrene elastomer and the standard additives including about 5% of wax using the phosphonitrilic compound of Formula C. The number of parts of antiozonant is based on 100 parts of rubber component or components in the tire stock composition. The various components including the sulfur, accelerator and antiozonant are all placed on a heated mill (160–180° F.) and mixed until the various ingredients are uniformly blended. The tire stock is cured at 300° F. and various property tests performed as indicated below in Table V. Also staining evaluation tests are performed in corresponding compositions in which there are incorporated 1.0, 2.0 and 2.5 parts respectively of this compound of Formula C, together with a sample in which no antiozonant is present other than the wax. These samples are exposed to a sunlamp. All the samples containing the phosphonitrilic compound remain white through 48 hours of exposure and reached only a very, very, very, slight yellow at the end of 64 hours. The sample with only the wax reaches this v.v.v. slight yellow stage within 18 hours and becomes increasingly yellow until it is a very definite yellow within 48 hours.

TABLE V

|  | A-12 | A-13 | A-14 | A-15 |
|---|---|---|---|---|
| Amount of Formula C Compound | 0.0 | 1.00 | 2.00 | 2.50 |
| *Normal Stress-Strain Values After Curing at 300° F.* | | | | |
| 300% Modules (p.s.i.), 23 Mins | 500 | 500 | 500 | 500 |
| Tensile Strength (p.s.i.), 23 mins | 3,025 | 2,625 | 3,200 | 2,625 |
| Ultimate Elongation (percent), 23 mins | 620 | 580 | 620 | 580 |
| *After Ageing 2 Days at 212° F.* | | | | |
| 300% Modulus (p.s.i.), 23 mins | 750 | 600 | 575 | 575 |
| Tensule (p.s.i.), 23 mins | 750 | 700 | 725 | 825 |
| Elongation (percent), 23 mins | 300 | 320 | 340 | 350 |
| *Ozone Evaluation 14 hrs., 60 p.p.h.m. Statis Ozone* | | | | |
| Dynamic 50/10: | | | | |
| 95° F | [1] Slight | Slight | Slight | Slight |
| 40° F | ([2]) | Slight | Slight | Slight |

[1] Slight means slight cracking.
[2] Very Severe.

EXAMPLE V

The procedure of Example IV is repeated a number of times using another white sidewall tire stock somewhat similar to that of Example IV except that the rubber base also contains a minor amount of an ethylene-propylene-cyclopentadiene terpolymer and using equivalent amounts of the antiozonant compounds of the Formulas C, D and E respectively. As controls, corresponding runs are performed using no antiozonant other than the wax that is present in each of the compositions. Similar results are obtained to those of Example IV.

EXAMPLE VI

The procedure of Example I is repeated a number of times with similar results using equivalent amounts of the following phosphonitrilic compounds:

(a) the phosphonitrilic polymer wherein $n$ is 15 and each Y represents Cl;
(b) the reaction product of one mole of $(NPCl_2)_3$ with 6 moles of thiourea;
(c) the reaction product of $(NPCl_2)_4$ with 8 moles of mercaptobenzothiazole;
(d) the polymer of (a) in which approximately half the chlorine has been replaced by $(CH_3)CHNH-$;
(e) the compound of Formula G in Table I;
(f) the compound of Formula K in Table I; and
(g) the compound of Formula M in Table I.

EXAMPLE VII

The procedure of Example IV is repeated a number of times with similar results using individually in place of the phosphonitrilic compound of that example an equivalent weight respectively of:

(a) Compound M of Table I;
(b) Compound N of Table I;
(c) Compound Q of Table I;
(d) Compound R of Table I;
(e) Compound U of Table I;
(f) Compound V of Table I;
(g) Compound DD of Table II;
(h) Compound EE of Table II;
(i) Compound GG of Table II;
(j) Compound HH of Table II; and
(k) The phosphonitrilic dichloride polymer in which $n$ has a value of 20 and half of the chlorine has been replaced by NHOH.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A tire rubber stock composition comprising
   (a) predominantly a rubber material selected from the class consisting of natural rubber and butadiene-styrene elastomers having 10–25 percent by weight of styrene and 90–75 percent by weight of butadiene copolymerized therein, and
   (b) 0.1–10% by weight of a phosphonitrilic compound selected from the class consisting of:
      (1) a cyclic phosphonitrilic compound having the formula $(NPY_2)_x$;
      (2) a phosphonitrilic polymer having the formula

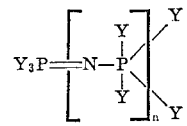

and
   (3) the reaction product of one mole of phosphonitrilic chloride of the formula $(NPCl_2)_x$ with 1–8 moles of thiourea or mercaptobenzothiazole; wherein $x$ has a value of 3 or 4; $n$ has a value of 2 to 100; Y is a radical selected from the class consisting of Cl, Br, I, NHOH, NHR', N(R')NHR', SH, Na, Li and Mg; and R' is hydrogen or a hydrocarbon radical having no more than 20 carbon atoms therein.

2. A composition of claim 1 in which said tire stock is a whitewall tire stock.

3. A composition of claim 1 in which said tire stock is an oil-extended reclaim black sidewall stock.

4. A composition of claim 1 in which said phosphonitrilic compound has Formula 1 in which $x$ equal 3.

5. The composition of claim 1 in which said phosphonitrilic compound has Formula 1 in which $x$ equals 4.

6. The composition of claim 1 in which said phosphonitrilic compound is 2,2,4,6-tetraisopropylamino-4,6-dichloro-2,4,6-triphospho-1,3,5-triazine.

7. The composition of claim 1 in which said phosphonitrilic compound is 2,2,4,4,6,6-hexa-(p-methylanilino)-2,4,6-triphospho-1,3,5-triazine.

8. The composition of claim 1 in which said phosphonitrilic compound is 2,2,4,4,6,6,8,8-octa-(p-methylanilino)-2,4,6,8-tetraphospho-1,3,5,7-tetrazine.

9. The composition of claim 1 in which said phosphonitrilic compound is 2,2,4,4,6,6-hexa-(sec.-butylamino)-2,4,6-triphospho-1,3,5-triazine.

10. The composition of claim 1 in which said tire stock is predominantly a natural rubber.

11. The composition of claim 1 in which said tire stock is predominantly a butadiene elastomer.

12. The composition of claim 1 in which said tire stock is predominantly a butadiene-styrene elastomer having 75–90 percent by weight butadiene and 10–25% styrene.

13. The composition of claim 1 in which said tire stock is predominantly an oil-extended butadiene elastomer.

References Cited

UNITED STATES PATENTS

| | | | |
|---|---|---|---|
| 2,374,646 | 5/1945 | Brown | 260—2 |
| 3,311,622 | 3/1967 | Joffre | 260—246 |
| 3,322,859 | 5/1967 | Sherr et al. | 260—893 |
| 3,344,087 | 9/1967 | Becke et al. | 260—2 |
| 3,364,189 | 1/1968 | Allcock et al. | 260—89.7 |
| 3,379,510 | 4/1968 | Jaszka | 23—357 |

DONALD E. CZAJA, Primary Examiner

R. A. WHITE, Assistant Examiner

U.S. Cl. X.R.

152—330; 260—2, 33.6, 45.9, 801, 887

UNITED STATES PATENT OFFICE
CERTIFICATE OF CORRECTION

Patent No. 3,474,052  Dated October 21, 1969

Inventor(s) Adel F. Halasa and Jerry D. Hunt

It is certified that error appears in the above-identified patent and that said Letters Patent are hereby corrected as shown below:

Col. 2, line 5 "again" should read -- against --

Col. 3, line 5 "form" should be -- from --

Col. 3, line 53 of Formula C should read thusly:
" $(CH_3)_2CHNH$ "

Col. 7, Table III, under the title "Normal Stress-Strain Cured at 300°F."
in the column entitled "Tensile Strength (p.s.i.),Mins." opposite the figure "15", 4th column, "150" should read -- 250 --

Col. 7, Table III, under the title "Aged 4 Days at 212°F." in the column headed "300% Modulus (p.s.i.),Mins.:" opposite the figure "30", 1st column, "1,509" should be -- 1,500 --

Col. 9, Table V, Under title "Normal Stress-Strain" etc. the word "Modules" in the first line should be
-- Modulus --

Col. 9, Table V, Under title "Ozone Evaluation 14 hrs." etc. the word "Statis" should read -- Static --

Signed and sealed this 12th day of October 1971.

(SEAL)
Attest:

EDWARD M. FLETCHER, JR.
Attesting Officer

ROBERT GOTTSCHALK
Acting Commissioner of Patents